(12) United States Patent  
Biederman et al.

(10) Patent No.: US 7,903,597 B2  
(45) Date of Patent: Mar. 8, 2011

(54) POWER MANAGEMENT OF A NETWORK DEVICE

(75) Inventors: Daniel Biederman, San Jose, CA (US); Dennis Fahey, Oakland, CA (US); Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 12/260,514

(22) Filed: Oct. 29, 2008

(65) Prior Publication Data

US 2010/0103955 A1 Apr. 29, 2010

(51) Int. Cl.
*G08C 17/00* (2006.01)
*H04J 3/06* (2006.01)
*H04L 7/00* (2006.01)
*G06F 1/00* (2006.01)

(52) U.S. Cl. ......... 370/311; 370/350; 370/503; 375/354; 713/300

(58) Field of Classification Search ............... 370/311, 370/350, 442, 445, 449–462; 455/13.4, 127.1, 455/402, 522, 524–525, 574; 713/300–400, 713/600; 375/354–369

See application file for complete search history.

(56) References Cited

U.S. PATENT DOCUMENTS

| | | | |
|---|---|---|---|
| 6,694,394 B1 * | 2/2004 | Bachrach | 710/100 |
| 6,795,450 B1 * | 9/2004 | Mills et al. | 370/463 |
| 7,127,521 B2 * | 10/2006 | Hsu et al. | 709/233 |
| 7,369,518 B2 | 5/2008 | Lee | |
| 7,382,232 B2 | 6/2008 | Gidge et al. | |
| 7,391,746 B2 | 6/2008 | Morimoto et al. | |
| 7,392,412 B1 | 6/2008 | Lo | |
| 7,401,239 B2 | 7/2008 | Chan et al. | |
| 2005/0097378 A1 * | 5/2005 | Hwang | 713/320 |
| 2006/0153238 A1 | 7/2006 | Bar-On et al. | |
| 2007/0030829 A1 | 2/2007 | Vimpari et al. | |
| 2007/0202835 A1 | 8/2007 | Son et al. | |
| 2007/0233835 A1 | 10/2007 | Kushalnagar et al. | |
| 2008/0304519 A1 * | 12/2008 | Koenen et al. | 370/477 |
| 2008/0310391 A1 * | 12/2008 | Schneidman et al. | 370/349 |
| 2009/0067373 A1 * | 3/2009 | Kneckt et al. | 370/328 |
| 2009/0097428 A1 * | 4/2009 | Kneckt et al. | 370/311 |
| 2009/0204827 A1 * | 8/2009 | Diab et al. | 713/320 |

OTHER PUBLICATIONS

Nedevschi et al., "Reducing Network Energy Consumption Via Sleeping and Rate-Adaption," Proceedings of the 5th USENIX Symposium on Networked Systems Design and Implementation, San Francisco, CA, pp. 323-336, 2008.
International Search Report and Written Opinion from PCT/US2009/062036, mailed on Dec. 9, 2009.

* cited by examiner

*Primary Examiner* — Tri H Phan
(74) *Attorney, Agent, or Firm* — BainwoodHuang

(57) ABSTRACT

In one embodiment, a method includes receiving a synchronization command to synchronize time information among each component of a set of components in a communication path. The method includes generating a power state message. The method includes transmitting the power state message, by the first component, to the remaining components in the communication path. The power state message is configured to reduce the power consumption of the remaining components of the set of components from a first power amount to a second power amount for a time period and the time period is associated with the synchronized time information.

25 Claims, 4 Drawing Sheets

POWER MANAGEMENT OF A NETWORK DEVICE

BACKGROUND

The present disclosure pertains generally to the field of power management of network devices.

Computer and information networks allow computer systems to exchange content or data. For example, Local Area Networks (LANs) provide communications and allow content exchange between computerized devices in business, campus, and residential environments. The predominant protocol for LAN communications is Ethernet. The Ethernet physical and data link layer (e.g., Layer 1 and Layer 2) specifications define how computerized devices exchange content over various types of physical connections such as twisted wire pairs, coaxial cables, and fiber optic cables.

For example, computerized devices configured for use on a LAN typically include a media access controller (MAC) and a physical interface transceiver (PHY). Conventional MACs are defined by the IEEE-802.3 Ethernet standard and are configured in the computerized devices as data link layers. Conventional PHYs connect corresponding MACs to a physical medium, such as a Category 5 twisted-pair wire, and are configured to exchange data between the MAC and the physical medium. In a receive mode, the PHY receives data from the physical medium and decodes the data into a form appropriate for the receiving computerized device. In a transmit mode, the PHY takes data from the computerized device, typically from the MAC, and converts the data into a form appropriate for the physical medium in use.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Computer devices associated with a network typically draw relatively large amounts of power during operation. On reason behind such a relatively large draw in power involves the amount of time in which the devices draw power. With respect to currently-specified Ethernet devices, during operation, the power draw of the associated PHYs remains relatively constant when either in an active or an idle mode of operation. For example, when in an active mode of operation, such as when transmitting packets at 10 Gigabit/sec, a conventional PHYs typically draws or consume about 8 Watts of power. However, when in an idle mode of operation, such as when not transmitting packets, conventional PHYs consume about 7 Watts of power. Accordingly, Ethernet devices, and specifically PHYs, draw power whether or not the Ethernet devices actively exchange data with other devices in the network. To address such a configuration of the PHYs, the IEEE P802.3az project (i.e., Energy Efficient Ethernet) defines mechanisms and communications that allow PHYs, MACs and associated devices to reduce power usage when there is no data to communicate.

The mechanisms and communications defined by the 802.3az standard operate independently for transmit and receive directions of a particular communication link and independently for all communications links. Therefore a device that has multiple communications links is typically not configured to predict or control when each link transitions between power states. Similarly, a network of communicating devices will experience unpredictable transitions between power states as traffic bursts traverse the network. It would be desirable that a device with multiple communication links be configured to predict and control when the device's various associated communication links and associated MAC and PHY devices transition between power states. Similarly, it would be desirable that multiple communicating devices in a network be configured to coordinate power state transitions to optimize the power usage and performance of the network.

Generally, a disclosed method includes receiving a synchronization command to synchronize time information among each component of a set of components in a communication path. The method includes generating a power state message. The method includes transmitting the power state message, by the first component, to the remaining components in the communication path. The power state message is configured to reduce the power consumption of the remaining components of the set of components from a first power amount to a second power amount for a time period and the time period is associated with the synchronized time information.

Description of Example Embodiments

Figure 1:
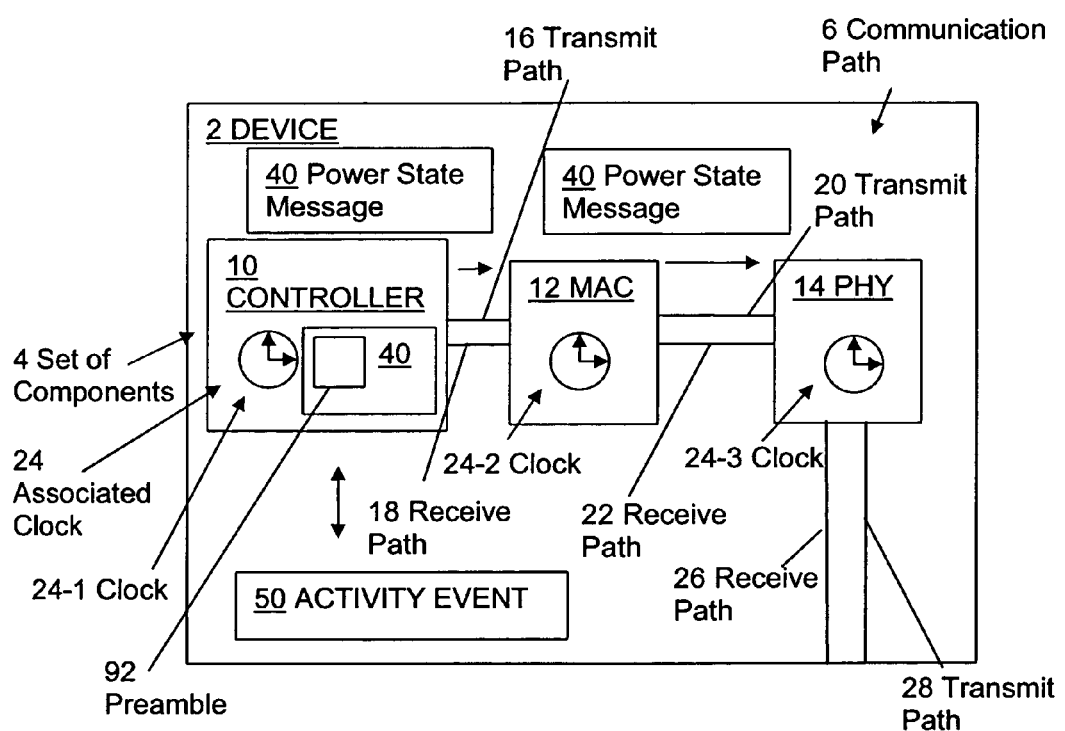
FIG. 1 illustrates a block diagram of a computerized device having a set of components.

FIG. 1 illustrates a block diagram of a computerized device 2 having a set of components 4 that form a communication path 6. In one arrangement, the computerized device 2 is configured as an Ethernet device, such as a personal computer, an Internet Protocol (IP) phone, or an access point. In such an arrangement, the computerized device 2 includes a controller 10, a media access controller (MAC) 12, and a physical interface transceiver (PHY) 14 which constitutes the set of components 4. The controller 10 in one arrangement includes a processor or central processing unit (CPU) and a memory is disposed in electrical communication with the MAC 12. For example, the controller 10 includes a transmit path 16 and a receive path 18 disposed in electrical communication with the MAC 12. The MAC 14 is configured as a data link layer and is disposed in electrical communication with the PHY 14 via a transmit path 20 and a receive path 22. While the controller 10 and MAC 14 are illustrated as separate components 4 on the communications path 6, in one arrangement, the controller 10 and MAC 14 are integrated together as a single component.

The PHY 14 is configured to connect the MAC 12 to a physical medium, such as a Category 5 twisted-pair wire, and is configured to exchange data between the MAC 12 and the physical medium. The PHY 14 can be configured in a variety of ways. For example, the PHY 14 can be configured as a Serial Media Independent Interface (SMII), a Serial Gigabit Media Independent Interface (SGMII), a 10 Gigabit Attachment Unit Interface (XAUI), or a High Speed Serial Interface for XFP.

As indicated above, during operation of conventional PHYs, the power draw of the conventional PHYs remains relatively constant when either in an active or an idle mode of operation. In order to reduce the amount of power drawn by the PHY 14 during operation, the set of components 4 along the communication path 6 are configured to allow for a time-based control of the power drawn by the components 4 during operation of the device 2. In order to allow for such time-based control, each of the set of components 4 along the communication path 6 are synchronized together such that each clock (e.g., clock signal) associated with each component 4 operates substantially in unison with each of the other clocks associated with the other components 4. For example, each of the controller 10, MAC 12, and PHY 14 contained in the computer device 2 has an associated clock, such as a crystal oscillator, where each of the clocks operate substantially in unison with each other. In one arrangement, as indicated in FIG. 1, each of the controller 10, MAC 12, and PHY 14 has an associated clock 24 (i.e., clocks 24-1, 24-2, and 24-3, respectively), such as an IEEE1588 clock. While each component 4 is shown as having its own clock 24-1, 24-2, and 24-3 the clocks of each of the components 4 can be configured in a variety of ways. In one arrangement, a subset of the components 4 (i.e., some combination of the controller 10, MAC 12, and PHY 14) can be integrated together as a single component, such as part of a single Application Specific Integrated Circuit (ASIC) and share a single clock, such as an IEEE1588 clock. For example, the MAC 12 and PHY 14 can be integrated together as part of a single ASIC and can share a single clock. In another arrangement, the controller 10 can be configured with the clock 24-1 and communicate a clock time to the MAC 12 and PHY 14. In yet another arrangement, one or more clocks are disposed external to the components 4 and communicate a clock time to each of the components 4.

While synchronization of the components 4 can be achieved in a variety of ways, in one arrangement, the components 4 are synchronized using the IEEE1588v2 standard to accurately synchronize the components 4 to nanoseconds of each other. In one arrangement, hardware time stamping protocols such as IEEE 802.1as or TicToc can be used to synchronize the associated clocks 24 of the components 4. In such an arrangement, each of the components 4 is synchronized in a substantially accurate manner. Accordingly, each of the components 4 can be configured to enter and exit a low power drawing state during operation of the device 2, as will be described below.

Figure 2:
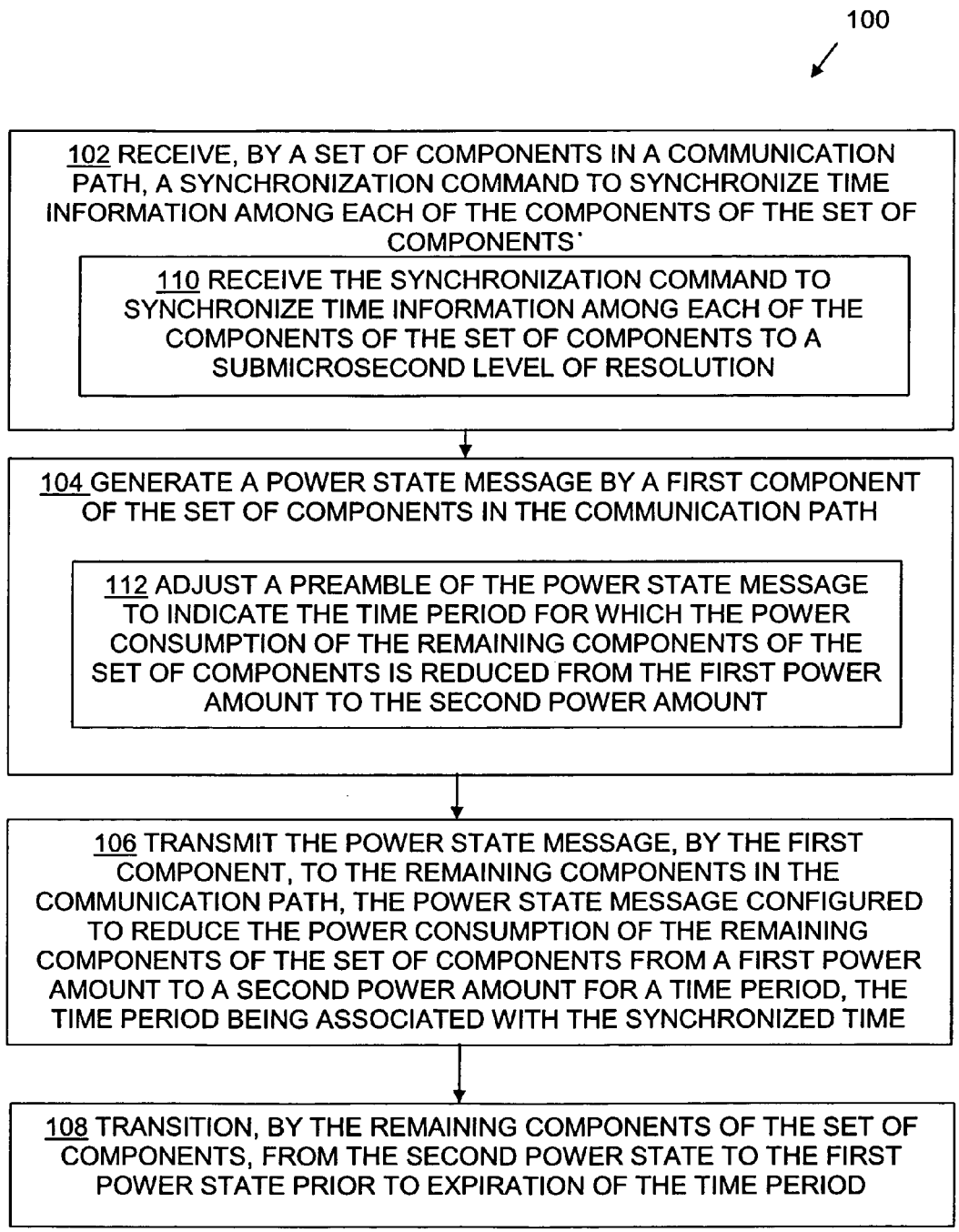
FIG. 2 is a flow diagram depicting a method of operation of the computerized device of FIG. 1 according to a one embodiment.

FIG. 2 is a flow diagram 100 depicting a method of operation of the computerized device 2 of FIG. 1, according to a one embodiment. During operation, the device 2 is configured such that an amount of power drawn by each of the components 4 is reduced for a given period of time.

In step 102, the set of components 4 in the communication path 6, receive a synchronization command to synchronize time information among each of the components of the set of components. In one arrangement, a device operator or systems administrator configures each of the components 4 such that the each of the clocks 24 operates substantially in unison. For example, the system administrator applies, as the synchronization command, hardware time stamping protocols such as NTP, 802.1as, or TicToc to the controller 10, MAC 12, and PHY 14 to synchronize the associated clocks 24-1 through 24-3. Synchronization of the components 4 in the communication path 6 minimizes the presence of jitter among the components 4 during operation, thereby allowing for accurate timing among the components 4. While the clocks 24 can be synchronized to a variety of levels of resolution, in one arrangement and as indicated in step 110, the synchronization command synchronizes time information among each of the components 4 to a submicrosecond level of resolution to provide a relatively higher level of resolution compared to NTP.

In step 104, a first component of the set of components 4 in the communication path 6 generates a power state message 40. For example, with reference to FIG. 1, the controller 10 of the device 2 generates the power state message 40. The power state message 40 provides the components 4 with notification regarding a period of time when the components 4 of the device 2 are to become inactive and enter a reduced or relatively low power drawing state. While the power state message 40 can provide, to the components 4, a notification regarding the components' entering the reduced or relatively low power drawing state for any period of time, in one arrangement, the period of time is less than an amount of time taken by a transmit buffer of a port of the device 2 to become full.

Returning to FIG. 2, in step 106, the first component transmits the power state message 40 to the remaining components in the communication path, the power state message 40 configured to reduce the power consumption of the remaining components of the set of components from a first power amount to a second power amount for a time period, the time period being associated with the synchronized time information. In one arrangement, with reference to FIG. 1, after the controller 10 of the device 2 has generated the power state message 40, the controller 10 transmits the power state message 40 to the MAC 12 and the PHY 14 to cause the MAC 12 and the PHY 14 to enter a low power drawing state, relative to the initial power draw state.

For example, assume the controller 10 generates a power state message 40 indicating that controller 10 will not transmit data for a period of 10 microseconds and transmits the power state message 40 to the MAC 12 via the transmit path 16. After having transmitted the power stage message 40, the controller 10 deactivates port logic associated with a port of the transmit path 16. By deactivating the port logic associated with the port of the transmit path 16, the controller 10 draws a reduced amount of power relative to an amount of power drawn when the port is active.

The MAC 12 receives the power state message 40 and examines the contents of the power state message 40. For example, based upon the content of the power state message 40, the MAC 12 detects that the controller 10 will not transmit data for a period of 10 microseconds. In response to such detection, the MAC 12 transmits the power state message 40 to the PHY 14 via the transmit path 20. As the MAC 12 sends the power state message 40 to the PHY 14, in response to the power state message 40, the MAC deactivates port logic associated with a port of the transmit path 20 for the period of 10 microseconds. By deactivating the port logic associated with the port of the transmit path 20, the MAC 12 draws a reduced amount of power relative to an amount of power drawn when the port is active (i.e., enters a reduced power draw state).

When the PHY 14 receives the power state message 40, the PHY 14 examines the contents of the power state message 40. For example, based upon the content of the power state message 40, the PHY 14 detects that the controller 10 will not transmit data for a period of 10 microseconds. In response to such detection, as the PHY 14 transmits the power state message 40 to a second device via a transmit path 24, the PHY 14 deactivates port logic associated with a port of the transmit path 24 for the period of 10 microseconds. By deactivating the port logic associated with the port of the transmit path 24, the PHY 14 draws a reduced amount of power relative to an amount of power drawn when the port is active (i.e., enters a reduced power draw state). For example, when transmitting packets at 10 Gigabit/sec, the MAC 12 and/or the PHY 14 can draw about 8 Watts of power. However, in one arrangement, in response to receiving the power state message 40 and deactivates port logic associated with a port of the transmit path 24, the PHY 14 can draw less than approximately 1 Watt of power (e.g., between about an 80% and 90% reduction in the amount of power drawn).

Because each of the components 4 is synchronized in a substantially accurate manner, such as by using hardware time stamping, each of the components 4 can be configured to enter and exit a low power drawing state during operation of the device 2 at substantially the same time. Such a configuration, therefore, allows for a time-based control of multiple parts of the components 4 of the communication path 6 in order to reduce the amount of power drawn and provide an energy savings for the device 2.

As indicated above, the MAC 12 and PHY 14 are configured to enter a reduced power draw state for a period of time indicated by, and in response to, the power state message 40. Accordingly, at the expiration of the time period, the MAC 12 and PHY 14 activate the port logic associated with the corresponding transmit paths 16, 20 and exit the low power draw state. In one arrangement, as shown in FIG. 2 at step 108, the remaining components of the set of components (i.e., the MAC 12 and PHY 14) are configured to transition from the second power state (i.e., the low power draw state) to the first power state (i.e., a relatively higher power draw state) prior to expiration of the time period. For example, assume the power state message 40 indicates that the controller 10 will not transmit data for a period of 10 microseconds. Each of the MAC 12 and PHY 14 enter the second or low power draw state by deactivating their associated port logic for a time period that is less than 10 microseconds, such as a period of 9 microseconds. At the expiration of the 9 microseconds, each of the MAC 12 and PHY 14 reactivate their associated port logic to transition into the first or relatively higher power draw state. By transitioning from the low to high power draw states prior to expiration of time period, the MAC 12 and PHY 14 minimizes the possibility of inadvertently dropping or missing packets transmitted from the controller 10 even if the time to transition is substantially greater than the buffering available.

While the controller 10 can generate the power state message 40 in response to a variety of situations, in one arrangement, the controller 10 generates the power state message 40 in response to detecting an activity event 50 associated with the device 2. For example, the device 2 can experience times during a day when the device 2 enters a period of reduced activity where the device 2 engages in limited communications with other devices on a network (e.g., between 1 AM and 5 AM). In one arrangement, a systems administrator who is aware of such substantially regular periods of reduced activity can configure the controller 10 to generate the power state message 40 during these times of the day. In another example, the device 2 can form part of a network having a bandwidth that is utilized for only a limited amount of time (e.g., less than about 15% of the total availability of the network). In such an arrangement, the controller 10 is configured to generate the power state message 40 in response to detecting relative inactivity of the device 2 on the network (e.g., minimal communication talking place between the device 2 and other connected devices). In another example, the controller 10 is configured to generate the power state message 40 in response to detecting a transmit buffer of the MAC 12 or PYH 14 as being empty. By generating the power state message 40 in response to detecting the activity event 50, the controller 10 optimizes the power saving of the device 2 while minimizing disruption to communications exchanged with other devices.

As indicated above, synchronization of components 4 (i.e., controller 10, MAC 12, and PHY 14) of a device 2 allows each of the components 4 to be configured to enter and exit a low power drawing state during operation of the device 2 at substantially the same time in order to reduce the amount of power drawn and provide an energy savings for the device 2. In one arrangement, components of interconnected devices across a network are synchronized in order to allow multiple devices draw a reduced amount of power during operation.

Figure 3:
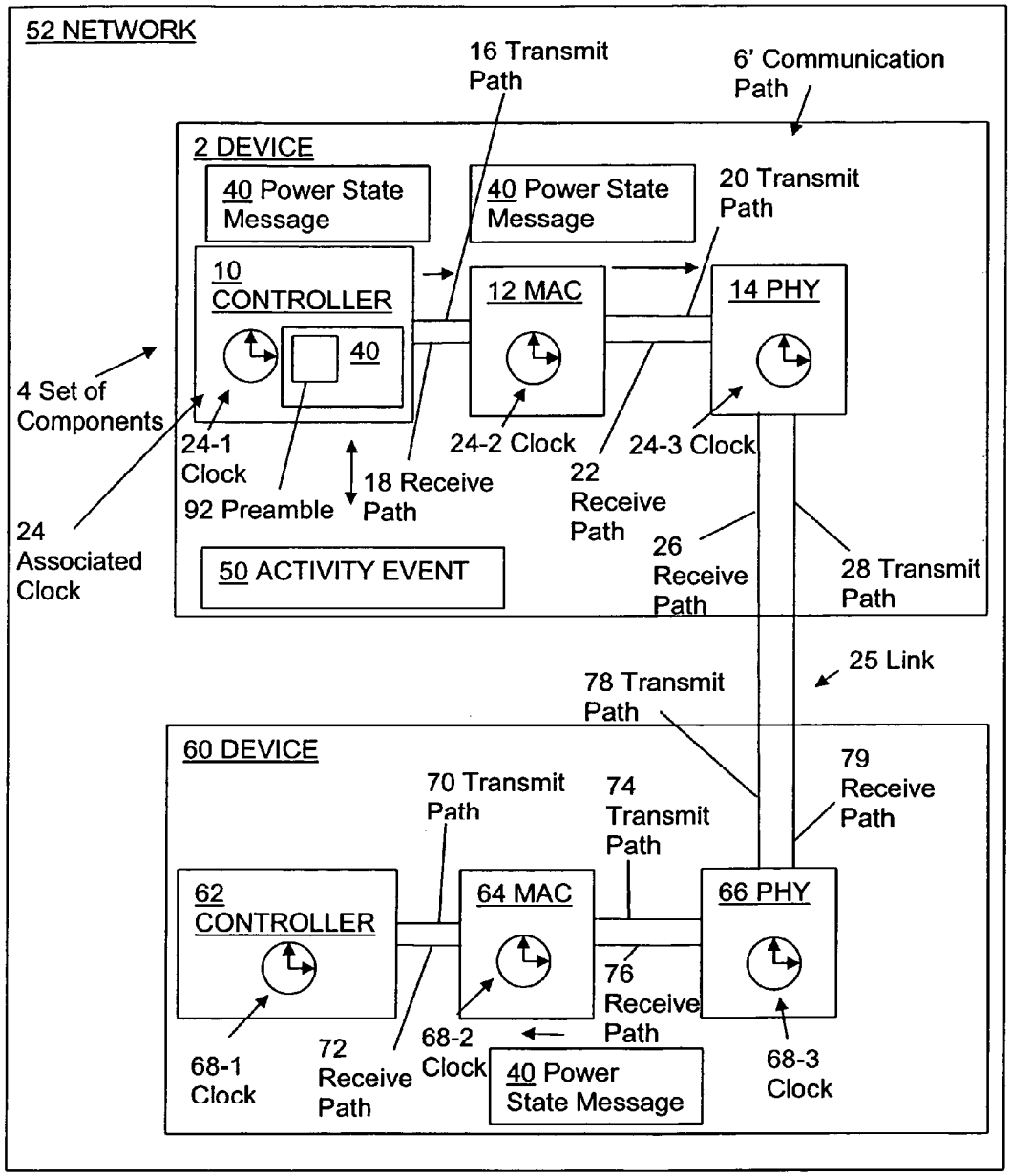
FIG. 3 illustrates a first block diagram of a system having the computerized device of FIG. 1, according to one embodiment.

For example, FIG. 3 illustrates an example of a network 52 such as a Local Area Network (LAN), an Ethernet network, or a Wide Area Network having the computerized device 2, such as a personal computer, interconnected, via a connector or link 25, with a second computerized device 60, such as a second personal computer. As shown, the device 60 includes a controller 62, a MAC 64, and a PHY 66. Accordingly, in the present example illustrated in FIG. 3, the communication path 6' includes the controller 10, the MAC 12, and the PHY 14 of the device 2 as well as the controller 62, the MAC 64, and the PHY 66 of the second device 60. The controller 62 includes a transmit path 70 and a receive path 72 disposed in electrical communication with the MAC 64. The MAC 64 is disposed in electrical communication with the PHY 66 via a transmit path 74 and a receive path 76. The PHY 66 is disposed in electrical communication with the link 25 via a transmit path 78 and a receive path 79 that, in turn is disposed in electrical communication with a receive path 26 and a transmit path 28 associated with the PHY 14 of device 2. In the arrangement shown each of the controller 62, MAC 64, and PHY 66 has an associated clock 68 (i.e., clocks 68-1, 68-2 and 68-3, respectively).

In use, a systems administrator synchronizes the clocks 24, 68 by applying a hardware time stamping protocol to the clocks 24, 68 to allow the clocks 24, 68 to operate substantially in unison. In such an arrangement, in the case where the controller 10 generates a power state message 40, the power state message 40 causes the components 4 in the communication path 6 (i.e., the components of the device 2 and the device 60) to enter a reduced or relatively low power drawing state.

For example, assume the controller 10 generates a power state message 40, such as in response to detecting an activity event 50, indicating that controller 10 will not transmit data for a period of 10 microseconds. As indicated above, in response to sending the power state message 40 to the MAC 12, the controller 10 deactivates port logic associated with a port of the transmit path 16. Also within the device 2, in response to the MAC 12 transmitting the power state message 40 to the PHY 14 via the transmit path 20, the MAC 12 deactivates port logic associated with a port of the transmit path 20. Additionally in the device 2, in response to the PHY 14 transmits the power state message 40 to the second device 60, the PHY 14 deactivates port logic associated with a port of the transmit path 24.

In the second device 60, the PHY 66 receives the power state message 40 from the PHY 14 via the link or connector 25 and over a receive path 78. When the PHY 66 receives the power state message 40, the PHY 66 examines the contents of the power state message 40. For example, based upon the content of the power state message 40, the PHY 66 detects that the controller 10 will not transmit data for a period of 10 microseconds. In response to such detection, as the PHY 66 transmits the power state message 40 to the MAC 64 via the receive path 76, the PHY 14 deactivates port logic associated with a port of the receive path 78 for the period of 10 microseconds. By deactivating the port logic associated with the port of the receive path 78, the PHY 66 draws a reduced amount of power relative to an amount of power drawn when the port is active (i.e., enters a reduced power draw state).

The MAC 64 receives the power state message 40 from the PHY 66 and examines the contents of the power state message 40. For example, based upon the content of the power state message 40, the MAC 64 detects that the controller 10 will not transmit data for a period of 10 microseconds. In response to such detection, the MAC 64 transmits the power state message 40 to the controller 62 via the receive path 72. As the MAC 64 sends the power state message 40 to the controller 62, in response to the power state message 40, the MAC 64 deactivates port logic associated with a port of the receive path 76 for the period of 10 microseconds. By deactivating the port logic associated with the port of the receive path 76, the MAC 64 draws a reduced amount of power relative to an amount of power drawn when the port is active (i.e., enters a reduced power draw state). In turn, when the controller 62 receives the power state message 40, the controller 62 examines the power state message 40, the controller 62 deactivates port logic associated with a port of the receive path 72 for a period of 10 microseconds to draw a reduced amount of power relative to an amount of power drawn when the port is active. At or near the conclusion of the 10 microsecond time period, each clock 24, 68 causes its associated component to transition from the low to high power draw states.

Because each of the components 4 is synchronized in a substantially accurate manner, such as by using hardware time stamping, each of the components 4 can be configured to enter and exit a low power drawing state during operation of the device 2 at substantially the same time. With respect to devices operating as part of an Ethernet-based LAN 52, such a configuration of the devices 2, 60 reduces the amount of power drawn by the devices 2, 60 during operation. Because of the relatively large number of Ethernet devices and ports that are typically utilized as part of a LAN, such a reduction in total power consumption of all of the devices of the LAN 52 can be relatively significant, on the order of several kilowatts.

The above example indicates that the device 2 generates the power state message 40 and transmits the message 40 over a transmit path (collectively 16, 20, and 28) and that the second device 60 receives the power state message 40 via the link 25 over a receive path (collectively 79, 76, and 72). With continued reference to FIG. 3, in one arrangement, the transmit path and the receive path for each of the devices 2, 60 operate independently from each other. Accordingly, the controller 62 of the second device 60 can generate and transmit a power state message 40 to the device 2 via a transmit path (collectively 70, 74, and 78) while the device 2 receives the power state message 40 via a receive path (collectively 18, 22, and 26). Additionally, assume the transmit path and associated circuitry of one device, for example device 2, and the receive path and associated circuitry of another device, for example device 60, were to become desynchronized. In such a case, the independence of the transmit path and the receive path for each of the devices 2, 60 allow the components associated with the path to remain at a relatively high power drawing state (i.e., the ports associated with the components along the path remain active) until the devices 2, 60 were able to re-establish synchronization.

Figure 4:
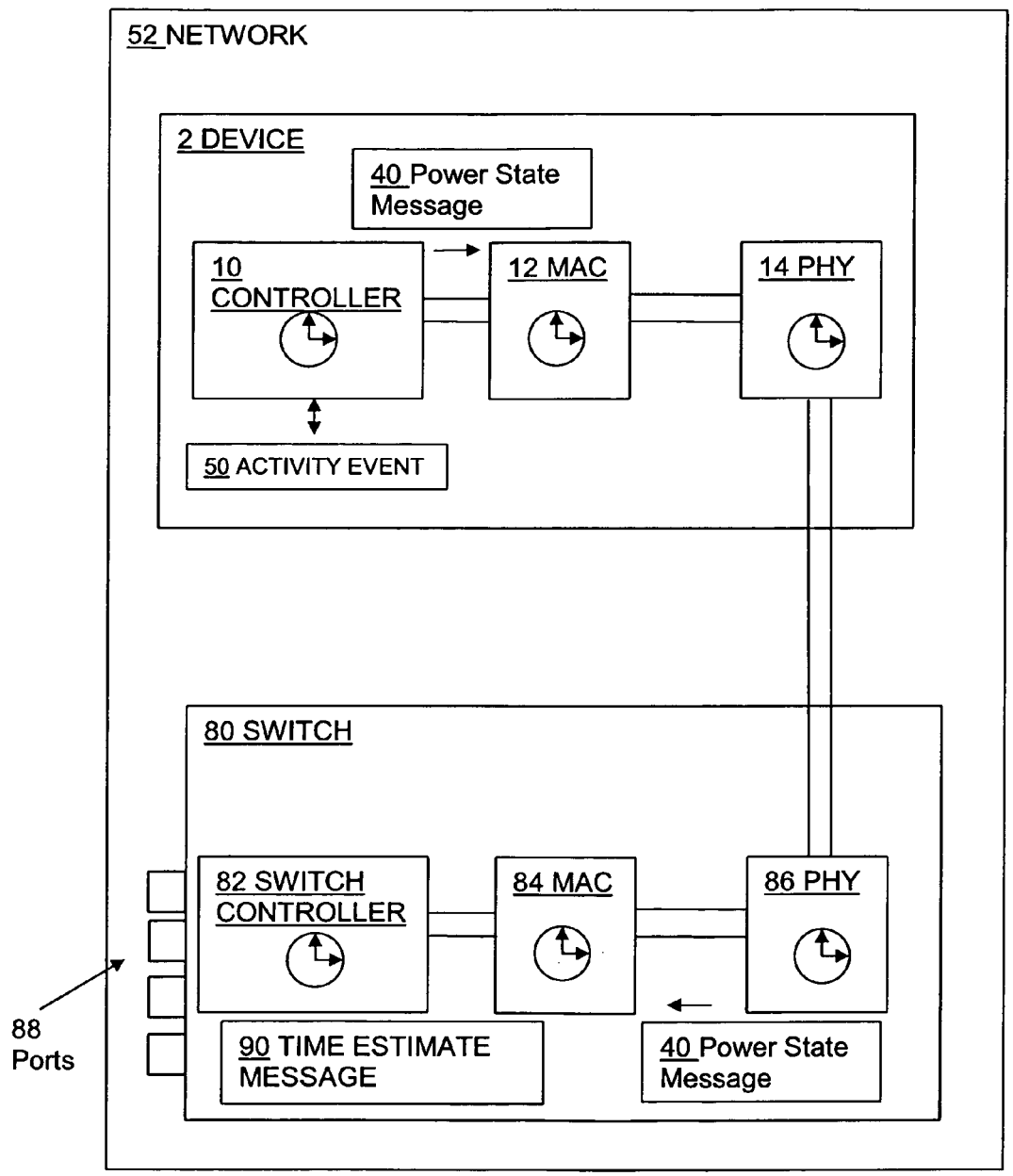
FIG. 4 illustrates a second block diagram of a system having the computerized device of FIG. 1, according to one embodiment.

As indicated above, FIG. 3 illustrates an example of a network 52 having the computerized device 2, such as a personal computer, interconnected, via a connector or link 25, with a second computerized device 60, such as a second personal computer. In one arrangement, as illustrated in FIG. 4, the second computerized device is configured as a switch or router 80 having a set of ports 88 that connect the device 2 to other devices in the network 52. During operation, the controller 10 of the device 2 can generate and transmit the power state message 40 to the switch 80 to cause the switch components 82, 84, and 86 to enter a reduced power draw state for a certain period of time. However, due to the configuration of the switch 80, the switch can receive packets from other devices in the network 52 via ports 88. Therefore, while the controller 10 provides the switch 80 with a time duration for entering into the reduced power draw state, the time duration can be too long a period since packets can arrive at the switch 80 at any time. Accordingly, in response to receiving the power state message 40, prior to the switch components 82, 84, and 86 entering a reduced power draw state, the switch 80 transmits to the controller 10 a time estimate message 90 indicating a time duration that the switch 80 can enter a reduced power draw state where the time duration indicated in the time estimate message 90 is less that the time duration indicated in the power state message 40. After having transmitted the time estimate message 90 to the controller 10, the switch 80 causes the switch components 82, 84, and 86 to enter the reduced power draw state for the time duration indicated in the time duration message 90.

In the event that the switch receives a packet at the ports 80 destined for the device 2 after having deactivated the switch components 82, 84, and 86 but during the time duration indicated in the time estimate message 90, in one arrangement, the switch 80 is configured to hold the packet in a queue until expiration of the time duration indicated in the time estimate message 90. Once the switch components 82, 84, and 86 transition from the low power draw state to the relatively higher power draw state, the switch 80 transmits the packet to the device 2.

While various embodiments of the invention have been particularly shown and described, it will be understood by those skilled in the art that various changes in form and details may be made therein without departing from the spirit and scope of the invention as defined by the appended claims.

In one embodiment, a system may have multiple instances of a device 2 that constitute network ports. Each of these network ports will transition between power states at times controlled by controllers 10. The controllers 10 may coordinate these power transitions to minimize the power drawn at a particular time and therefore maximize the energy savings. Alternatively the controllers 10 can coordinate these power transitions to avoid large instantaneous changes in power consumption caused by simultaneous transitions of multiple ports. Such coordination can reduce the stress on the system and allow more efficient design practices. Alternatively the controllers 10 can coordinate these power transitions to minimize the variation of the total power drawn. Such minimization can allow more efficient power supply utilization leading to reduced energy usage.

For example, as indicated above, the power state message 40 provides the components 4 with notification regarding a period of time when the components 4 of the device 2 are to become inactive and enter a reduced or relatively low power drawing state. While the power state message 40 can provide such notification in a variety of ways, in one arrangement, and with reference to FIG. 1 and step 112 of FIG. 2, the controller 10 adjusts a preamble 92 of the power state message 40 to indicate the time period for which the power consumption of the remaining components of the set of components is reduced from the first power amount to the second power amount. For example, in one arrangement the controller 10 sets a bit in the preamble 92 to indicate the time period for which the components (e.g., the MAC 12 and PHY 14) will enter the reduced power draw state.

In another example, a buffer associated with a device may be empty for a period of time that is longer than the time duration of the reduced power consumption state. In one arrangement, the device 2 is configured to maintain the components 4 in a reduced power consumption state in the case where the devices' buffers do not receive a packet after expiration of the aforementioned time duration. For example, in such an arrangement, the preamble 92 of the last packet in a buffer of the device indicates to each component 4 that each component 4 enters the reduced power consumption state for a first time period. The preamble 92 of the last packet in the buffer also indicates that upon expiration of the first time period, if no packets are present in the component's buffer, the component 4 is to re-enter the reduced power consumption state for a second time period. The process then repeats until the component 4 detects the presence of a packet in its associated buffer. The process minimizes the need for the controller 10 to transmit multiple power state messages 40 indicating times for the components to enter consecutive reduced power consumption states when the components 4 are relatively inactive.

Also, as indicated above, the power state message 40 provides the components 4 within a device 2 or connected over an Ethernet or LAN with notification regarding a period of time when the components 4 of the device 2 are to become inactive and enter a reduced or relatively low power drawing state. Such description is by way of example only. In one arrangement, the power state message 40 provides notification to devices disposed across a Wide Area Network (WAN) regarding a period of time when the devices (e.g., switches, routers, servers, and other computerized devices) are to become inactive and enter a reduced or relatively low power drawing state. In such an arrangement, an administrator synchronizes devices of the network. With such synchronization, the administrator accounts for latencies in the network with respect to specific transmitting and receiving times required by the devices. With such synchronization, in the case where a first device detects underutilization of a portion of the network (e.g., that the network's bandwidth utilization is below a particular threshold), the first device can transmit commands to the other devices in the network causing the devices to enter into a reduced power draw state for a period of time. While the commands can cause all of the other devices in the network to enter the reduced power draw state at the same time, in one arrangement the commands can cause the device in the network to enter the reduced power draw state in a staggered manner or at different times. By synchronizing traffic entering or leaving a set of ports in such a manner, such an arrangement can maximize an energy savings across the WAN or LAN while reducing stresses on the power supply mechanisms caused by power load changes.

With reference to FIG. 1, the computerized device 2 includes a controller 10, a MAC 12, and a PHY 14 which constitutes the set of components 4 of the communication path 6. Such description is by way of example only. While the controller, MAC 12, and PHY 14 are illustrated, the communication path 6 can include a variety of components 4. For example the components 6 can be configured as an optical Ethernet component such as Serdes, a port transmission circuit, a port receive circuits, or a power supply.

What is claimed is:

1. A method, comprising:
   receiving, by a set of components of a first device, a synchronization command to synchronize time information among each component of the set of components in a communication path;
   generating, by a first component of the set of components, a power state message; and
   transmitting, by the first component of the set of components, the power state message to the remaining components of the set of components in the communication path, the power state message configured to reduce the power consumption of the remaining components of the set of components from a first power amount to a second power amount for a time period, the time period being associated with the synchronized time information.

2. The method of claim 1, wherein:
   generating the power state message by the first component of the set of components comprises generating the power state message by a controller in the communication path, the controller associated with the first device; and
   transmitting the power state message to the remaining components in the communication path, comprises transmitting the power state message, by the controller, to a physical layer (PHY), the PHY associated with the device, the power state message configured to reduce the power consumption of the PHY associated with the first device from a first power amount to a second power amount for the time period.

3. The method of claim 1, wherein:
   generating the power state message by the first component of the set of components comprises generating the power state message by a controller in the communication path, the controller associated with the first device; and
   transmitting the power state message, by the first component of the set of components, to the remaining components in the communication path, comprises:
   transmitting, by the controller, the power state message to a physical layer (PHY), the PHY associated with the first device, the power state message configured to reduce the power consumption of the PHY associated with the first device from a first power amount to a second power amount for the time period, and
   transmitting the power state message, by the PHY associated with the first device, to a second device having a set of components in the communication path, the power state message configured to reduce the power consumption of the set of components associated with the second device from a first power amount to a second power amount for the time period.

4. The method of claim 3, wherein transmitting the power state message, by the PHY associated with the first device to a second device having a set of components in the communication path comprises transmitting the power state message, by the PHY associated with the first device to a PHY associated with the second device, the power state message configured to reduce the power consumption of the PHY associated with the second device from a first power amount to a second power amount for the time period.

5. The method of claim 3, comprising, in response to transmitting the power state message, by the first component of the set of components, to the remaining components in the communication path, receiving, by the first component of the set of component, a time estimate message indicating a time period for which the second device can enter a second power draw state associated with the second power amount, the time period indicated in the time estimate message being less that the time period indicated in the power state message.

6. The method of claim 1, wherein generating a power state message comprises:
   detecting, by the first component of the set of components, an activity event associated with the set of components in the communication path; and
   generating, by the first component of the set of components, the power state message in response to detecting the activity event.

7. The method of claim 6, wherein detecting, by the first component of the set of components, an activity event associated with the set of components in the communication path comprises detecting relative inactivity of the set of components in the communication path.

8. The method of claim 6, wherein detecting, by the first component of the set of components, an activity event associated with the set of components in the communication path comprises detecting, by the first component of the set of components, a transmission buffer of at least one component of the set of components in the communication path as being empty.

9. The method of claim 1 comprising transitioning, by the remaining components of the set of components, from the second power state to the first power state prior to expiration of the time period.

10. The method of claim 1, wherein generating the power state message, by the first component of the set of components, comprises adjusting, by the first component of the set of components, a preamble of the power state message to indicate the time period for which the power consumption of the remaining components of the set of components is reduced from the first power amount to the second power amount.

11. The method of claim 1, wherein receiving the synchronization command, by the set of components of the first device, comprises receiving the synchronization command to synchronize time information among each of the components of the set of components to a submicrosecond level of resolution.

12. The method of claim 1, wherein:
   generating the power state message by the first component of the set of components comprises generating the power state message by a controller in the communication path, the controller associated with a device; and
   transmitting, by the first component of the set of components, the power state message to the remaining components in the communication path, comprises transmitting the power state message, by the controller, to at least one network port associated with the device, the power state message configured to transition the power consumption of the at least one network port between a first power amount to a second power amount.

13. The method of claim 1, wherein transmitting, by the first component of the set of components, the power state message to the remaining components of the set of components in the communication path to reduce the power consumption of the remaining components of the set of components from the first power amount to the second power amount for the time period comprises transmitting, by the first component of the set of components, the power state message to reduce the power consumption of the remaining components of the set of components from the first power amount to the second power amount for the time period in a staggered manner.

14. The method of claim 1, wherein receiving, by the set of components of the first device, the synchronization command to synchronize time information among each component of the set of components in the communication path comprises receiving by a controller and a physical layer (PHY) of the first device, the controller and the PHY forming the set of components of the first device, a hardware time stamping protocol as the synchronization command to synchronize a clock associated with the controller with a clock associated with the PHY such that the clock associated with the controller operates substantially in unison with the clock associated with the PHY.

15. A device, comprising:
   a set of components in a communication path configured to receive a synchronization command to synchronize time information among each of the components of the set of components;
   a first component of the set of components in the communication path configured to generate a power state message; and
   the first component of the set of components configured to transmit the power state message to the remaining components of the set of components in the communication path, the power state message configured to reduce the power consumption of the remaining components of the set of components from a first power amount to a second power amount for a time period, the time period being associated with the synchronized time information.

16. The device of claim 15, wherein:
   the first component of the set of components comprises a controller configured to generate the power state message; and
   when transmitting the power state message to the remaining components of the set of components in the communication path, the controller is configured to transmit the power state message to a physical layer (PHY), the PHY associated with the device, the power state message configured to reduce the power consumption of the PHY associated with the device from a first power amount to a second power amount for the time period.

17. The device of claim 15, wherein:
   the first component of the set of components comprises a controller configured to generate the power state message;
   when transmitting the power state message to the remaining components in the communication path, the controller is configured to transmit the power state message to a physical layer (PHY), the PHY associated with the device, the power state message configured to reduce the power consumption of the PHY associated with the device from a first power amount to a second power amount for the time period; and
   the PHY associated with the device is configured to transmit the power state message to a second device having a set of components in the communication path, the power state message configured to reduce the power consumption of the set of components associated with the second device from a first power amount to a second power amount for the time period.

18. The device of claim 17, wherein, in response to transmitting the power state message by the first component of the set of components, to the remaining components in the communication path, the first component is configured to receive a time estimate message indicating a time period for which the second device can enter a second power draw state associated with the second power amount, the time period indicated in the time estimate message being less that the time period indicated in the power state message.

19. The device of claim 15, wherein when generating a power state message, the first component of the set of components in the communication path is configured to:
- detect an activity event associated with the set of components in the communication path; and
- generate the power state message in response to detecting the activity event.

20. The device of claim 19, wherein when detecting an activity event associated with the set of components in the communication path, the first component is configured to detect relative inactivity of the set of components in the communication path.

21. The device of claim 19, wherein when detecting an activity event associated with the set of components in the communication path, the first component is configured to detect a transmission buffer of at least one component of the set of components in the communication path as being empty.

22. The device of claim 15, wherein the remaining components of the set of components are configured to transition from the second power state to the first power state prior to expiration of the time period.

23. The device of claim 15, wherein, when generating the power state message by the first component of the set of components in the communication path, the first component of the set of components in the communication path is configured to adjust a preamble of the power state message to indicate the time period for which the power consumption of the remaining components of the set of components is reduced from the first power amount to the second power amount.

24. The device of claim 23 wherein when the first component of the set of components in the communication path is configured to adjust the preamble of the power state message to indicate the time period for which the power consumption of the remaining components of the set of components is reduced from the first power amount to the second power amount, the first component of the set of components in the communication path is configured to adjust a preamble of a last packet in a buffer of the first component to indicate the time period for which the power consumption of the remaining components of the set of components is reduced from the first power amount to the second power amount and to indicate that upon expiration of the first time period, if no packets are present in a buffer of the remaining components of the set of components each component of the remaining components of the set of components is to re-enter the reduced power consumption state for a second time period.

25. The device of claim 15, wherein, when receiving the synchronization command, the set of components in the communication path are configured to receive the synchronization command to synchronize time information among each of the components of the set of components to a submicrosecond level of resolution.

* * * * *